(12) United States Patent
Lundgren et al.

(10) Patent No.: US 9,844,056 B2
(45) Date of Patent: Dec. 12, 2017

(54) SPECTRUM ALLOCATION IN A WIRELESS NETWORK

(71) Applicant: THOMSON LICENSING, Issy de Moulineaux (FR)

(72) Inventors: Henrik Lundgren, Le Plessis Robinson (FR); Julien Herzen, Chavannes-Renens (CH); Nidhi Hegde, Paris (FR)

(73) Assignee: Thomson Licensing, Issy-les-Moulineaux (FR)

( * ) Notice: Subject to any disclaimer, the term of this patent is extended or adjusted under 35 U.S.C. 154(b) by 299 days.

(21) Appl. No.: 14/322,162

(22) Filed: Jul. 2, 2014

(65) Prior Publication Data

US 2015/0009909 A1    Jan. 8, 2015

(30) Foreign Application Priority Data

Jul. 2, 2013 (EP) .................................... 13305939

(51) Int. Cl.
*H04W 72/04* (2009.01)
*H04W 52/24* (2009.01)
(Continued)

(52) U.S. Cl.
CPC ..... *H04W 72/0453* (2013.01); *H04W 52/241* (2013.01); *H04W 72/08* (2013.01); *H04W 28/20* (2013.01); *H04W 72/0426* (2013.01)

(58) Field of Classification Search
None
See application file for complete search history.

(56) References Cited

U.S. PATENT DOCUMENTS 7,990,863 B2    8/2011   Yagyu et al.
2008/0242346 A1*  10/2008   Rofougaran ......... H04B 1/0067
                                                      455/552.1

(Continued)

OTHER PUBLICATIONS

Flushing. A mobility-assisted protocol for supervised learning of link quality estimates in wireless networks. Computing, Networking and Communications (ICNC), 2012 International Conference on Date of Conference: Jan. 30, 2012Feb. 2, 2012. pp. 137 143. E-ISBN:9781467307239.*

(Continued)

*Primary Examiner* — Jeffrey M Rutkowski
*Assistant Examiner* — Andre Tacdiran
(74) *Attorney, Agent, or Firm* — Myers Wolin LLC

(57) ABSTRACT

Method of spectrum allocation in a wireless network, comprising the steps, performed by a first access point connected to said wireless network and operating at a first spectrum configuration, chosen from a finite set of spectrum configurations, each spectrum configuration in the set comprising a channel center frequency, a channel width and a transmit power, of:

a) estimation of a performance indicator of at least one first link connecting the first access point and at least one first client of said first access point, for at least one spectrum configuration among said finite set of spectrum configurations; and
  b) switching the operation of the first access point to a new spectrum configuration identified among said finite set of spectrum configurations on the basis of a utility parameter determined at least on the basis of the estimated performance indicator.

17 Claims, 2 Drawing Sheets

(51) Int. Cl.
*H04W 72/08* (2009.01)
*H04W 28/20* (2009.01)

(56) References Cited

U.S. PATENT DOCUMENTS

| | | | | |
|---|---|---|---|---|
| 2009/0034457 A1* | 2/2009 | Bahl | H04W 16/10 | 370/329 |
| 2009/0040972 A1* | 2/2009 | Robson | H04W 16/14 | 370/329 |
| 2009/0054002 A1* | 2/2009 | Urushihara | H04W 28/16 | 455/67.13 |
| 2009/0110087 A1* | 4/2009 | Liu | H04L 1/0021 | 375/260 |
| 2009/0163221 A1* | 6/2009 | Abedi | H04W 16/10 | 455/452.1 |
| 2009/0175369 A1* | 7/2009 | Atarashi | H04L 1/0003 | 375/260 |
| 2009/0319236 A1* | 12/2009 | Blaunshtein | H04W 16/22 | 703/1 |
| 2011/0013600 A1* | 1/2011 | Kim | H04L 5/0085 | 370/332 |
| 2011/0211622 A1* | 9/2011 | Wang | H04B 7/0408 | 375/220 |
| 2012/0077534 A1* | 3/2012 | Matsuo | H04W 76/043 | 455/509 |
| 2013/0089039 A1* | 4/2013 | Vashi | H04W 72/02 | 370/329 |
| 2013/0252558 A1* | 9/2013 | Nieto | H04W 72/08 | 455/73 |
| 2014/0211686 A1* | 7/2014 | Cariou | H04W 72/0426 | 370/312 |
| 2014/0293867 A1* | 10/2014 | Horiuchi | H04W 16/14 | 370/315 |
| 2014/0321409 A1* | 10/2014 | Kim | H04W 16/14 | 370/329 |
| 2015/0038190 A1* | 2/2015 | Carter | H04W 52/244 | 455/522 |

OTHER PUBLICATIONS

Broustis etal: "Measurement-driven guidelines for 802.11 WLAN design",IEEE / ACMTransactions on Networking,IEEE / vol. 18, No. 3, Jun. 1, 2010 (Jun. 1, 2010), pp. 722-735.
Ahmed et al: "SMARTA: A selfmanaging architecture for thin access points". Database Compendex [Online], Engineering Information, Inc. 2006, pp. 1-12.
Celeb etal: "Cognitive-Radio Systems for Spectrum, Location, and Environmental Awareness", IEEE Antennas and Propagation Magazine, vol. 52, No. 4, Aug. 1, 2010, pp. 41-61.
Smola etal: "A Tutorial on Support Vector Regression",Neurocolt Technical REPORTNC-TR-98-030), Jan. 1, 1998 (Jan. 1, 1998), pp. 1-122.
Yang et al: "Physical Interference Driven Dynamic Spectrum Management",New Frontiers in Dynamic Spectrum Access Networks,2008, Oct. 14, 2008 (Oct. 14, 2008) , pp. 1-12.
Neely etal: "Dynamic power allocation and routing for time varying wireless networks", In IEEE Journal on Selected Areas in Communications, pp. 89-103, 2003.
Akella etal: "Self-management in chaotic wireless deployments", ACM Mobicom 05, Aug. 28-Sep. 2, 2005, Cologne, Germany. pp. 185-199.
Arslan et al: "Auto-configuration of 802.11n WLANs". In Proceedings of the 6th International Conference, Co-NEXT ™ 10, pp. 27:1-27:12, New York, NY, USA, 2010. ACM.
Borst etal: "Distributed Power Allocation and User Assignment in OFDMA Cellular Networks", 2011 49th Annual Allerton Conf. Sep. 28-30, 2011, pp. 1055-1063.
Brousti etal: "Implications of Power Control in Wireless Networks: A Quantitative Study", Proceedings of the 8th Int'l Conf. PAM'07, 2007, pp. 83-93.
Chandra et al: "A case for adapting channel width in wireless networks",SIGCOMM '08, Aug. 17-22, 2008, Seattle, Washington, USA, pp. 135-146, 2008.
Deek et al:"The Impact of Channel Bonding on 802.11n Network Management". Proceedings of the 7th Conf.on Emerging Networking Experiments & Technologies CoNEXT'11,2011,pp. 11:1-1:12.
Drucker et al: "Support vector regression machines", Advances in neural information processing systems, 1997, pp. 155-161.
Kauffmann et al: "Measurement-Based Self Organization of Interfering 802.11 Wireless Access Networks". IEEE INFOCOM2007 proceedings, 2007, pp. 1451-1459.
Heusse et al: "Performance anomaly of 802.11b", In Proceedings of IEEE Infocom 2003, San Francisco, USA, Mar. 30-Apr. 3, 2003, pp. 836-843.
Leith et al: "WLAN channel selection without communication", Computer Networks, Jan. 2012, pp. 535-543.
Mhatre et al: "Interference mitigation through power control in high density 802.11 WLANs", In IEEE INFOCOM 07 proceedings, 2007 IEEE, pp. 535-543, May 2007.
Moscibroada et al: "Load-Aware Spectrum Distribution in Wireless LANS", IEEE ICNP, Oct. 19-22, 2008. pp. 137-146.
Qian etal: "Globally optimal distributed power control fornonconcave utility maximization". CoRR, 2011, pp. 1-30.
Rayanchu et al: "FLUID: Improving throughputs in enterprise wireless LANs through flexiblechannelization", Mobicom 11, Sep. 19-23, 2011, Las Vegas. Nevada, USA, pp. 1-12.
Tse et al: "Fundamentals of wireless communication". Cambridge University Press, New York, NY, USA, 2005. Book: chapter 5—Capacity of wireless channels—pp. 166-227.
Uddin et al: "Design Methods for Optimal Resource Allocation in Wireless Networks", Jan. 2012, A thesis in the Depart.of Electrical and Computer Engineering Concordia University, pp. 1-169.
Yuan etal,"Allocating dynamic time-spectrum blocks in cognitive radio networks", In ACM MobiHoc 07,Sep. 9-14, 2007, Montreal, Quebec, Canada, pp. 1-10.
Search Report dated Jan. 30, 2014.

* cited by examiner

SPECTRUM ALLOCATION IN A WIRELESS NETWORK

This application claims the benefit, under 35 U.S.C. §119 of European Patent Application No. 13305939.4, filed Jul. 2, 2013.

FIELD OF THE INVENTION

The present invention generally relates to the field of wireless networks.

More particularly, the invention deals with the spectrum allocation in such networks.

Thus, the invention concerns a method of spectrum allocation in a wireless network. It also concerns a corresponding access point of a wireless network and a computer program implementing the method of the invention.

BACKGROUND OF THE INVENTION

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

Wireless networks are put under an ever increasing pressure to provide more throughput using a limited spectrum. The recent trend to increase the nominal capacity has been essentially to increase the number of MIMO (Multiple Input Multiple Output) spatial streams, and use larger channel widths, up to 40 MHz for the IEEE 802.11n standard and up to 160 MHz for the IEEE 802.11ac standard.

Off-the-shelf IEEE 802.11 hardware can be configured to adapt the channel width or the transmit power or the channel center frequency. Each of these three parameters has a large impact on both the performance and the interference created on neighboring links.

The channel width determines the amount of spectrum that they consume, the transmit power relates to the intensity of this spectrum usage and the channel center frequency determines where they operate in the available spectrum band.

These different parameters have usually been considered in isolation, even though they are tightly coupled and strongly interacting. All of them influence, usually in complex ways, the amount of interference as well as the capacity experienced by interfering wireless links.

Usually, for an isolated link having a large enough SNR (Signal to Noise Ratio), the effective capacity grows approximately linearly with the channel width, and increasing the latter is beneficial.

However, the total amount of available spectrum is finite, and using larger channel widths increases the likelihood that two neighboring links use overlapping portions of the spectrum. Indeed, it has been observed that using larger channel widths can increase interference to an extent that is detrimental to the effective capacity. For this reason, the current IEEE 802.11n standard can operate using two different channel widths, namely, 20 MHz and 40 MHz, the latter being referred to as channel-bonding.

Thus, there is a need for automated procedures that efficiently select the width of the spectrum interval used by the nodes of a wireless network.

For a given transmit power, adapting the channel width changes the amount of power-per-hertz, which in turn impacts the SNR. In addition, because it takes more time to send a packet using a narrow channel width, this parameter directly impacts IEEE 802.11 CSMA/CA (Carrier Sense Multiple Access with Collision Avoidance) channel access arbitration and interference in the time domain.

Using variable transmit powers has been acknowledged as being a potentially efficient way of improving the performance of wireless networks. For isolated links, using as large a transmit power as possible is usually beneficial. However, when several links are present, it may be more efficient to reduce the transmit power of some links, which comes at the price of potentially reducing the effective capacity of these links, in order to reduce their interference range and increase spectral re-use.

Finally, while it is well understood that adapting the transmit power has the potential benefit of increasing the spectral re-use, this parameter is hardly touched in practice, due to potentially detrimental effects. While reducing the transmit power can reduce the interference range of a node, it can also deteriorate the SNR at the receivers, possibly making the node switch to lower physical rates. Because lowering the physical rate increases the airtime consumption, decreasing the transmit power can thus sometimes increase the effective interference of a node on its neighbors.

For both transmit power and channel width, there is therefore a trade-off between the capacity experienced by isolated links, and the amount of interference introduced when several links interfere.

For fixed channel width and power, the influence of channel center frequency has been thoroughly studied in the literature. Whether it is applied in centralized or distributed settings, the problem usually has an unilateral objective, which consists in reducing interference between neighboring wireless nodes. In this case, it is usually beneficial to separate transmissions as much as possible in the spectral domain. When considering multiple widths and transmit powers, these techniques do not capture the corresponding dependence of the link capacities.

There has been some work considering simultaneous channel center frequency and width allocation for IEEE 802.11 networks. A first approach reduced this problem to an efficient packing of time-spectrum blocks, where the goal is to avoid block overlaps both in time and frequency. A second approach proposed a variable-width scheme where highly loaded access points are favored to use more spectrum, so as to introduce a natural load-balancing. However, these approaches neglected much of the complexity of actual interference patterns. A third approach considered an enterprise setting with a central controller, and proposed an algorithm for assigning channel center frequencies and widths. However, its centralized setting restrains this method to enterprise networks.

Some prior art considered channel assignment, i.e. channel center frequency, and transmit power. For instance, Ahmed et al. proposed in "Smarta: a self managing architecture for thin access points", in Proceedings of the 2006 ACM CoNEXT conference, CoNEXT'06, pages 9:1-9:12, New York, USA, 2006, a method for assigning channels and transmit powers to access points in enterprise networks. In this paper, channel assignment is performed at a slower time scale, then power-level is assigned at a faster time scale. This method targets enterprise setting, where a central network controller is present to decide on the resource allocation.

None of the existing spectrum allocation methods can be applied in current IEEE 802.11-based wireless networks in order to ensure a satisfying end-user quality of experience.

SUMMARY OF THE INVENTION

The present invention proposes a solution for improving the situation.

Accordingly, the present invention provides a method of spectrum allocation in a wireless network, comprising the steps, performed by a first access point connected to said wireless network and operating at a first spectrum configuration, chosen from a finite set of spectrum configurations, each spectrum configuration in the set comprising a channel center frequency, a channel width and a transmit power, of:

a) estimation of a performance indicator of at least one first link connecting the first access point and at least one first client of said first access point, for at least one spectrum configuration among said finite set of spectrum configurations; and b) switching the operation of the first access point to a new spectrum configuration identified among said finite set of spectrum configurations on the basis of a utility parameter determined at least on the basis of the estimated performance indicator.

Thus, the present invention performs a generalized spectrum allocation by optimizing jointly and simultaneously the parameters controlling the spectrum consumption of a wireless network, these parameters comprising the channel center frequency, the channel width and the transmit power. This joint and simultaneous optimization permits a better control of the spectrum consumption while avoiding interferences between neighboring wireless networks. Consequently, the quality of the links between the access point and its clients is improved thus improving the end-users experience.

The performance indicator is a measurable criterion of the performance of the wireless link between the access point and the client, such as the throughput and/or the delay and/or the packet loss rate and/or the jitter on said link.

The utility parameter is related to the network capacity currently required by a user and more generally to the user satisfaction.

Preferably, step a) is performed for all the spectrum configurations in order to have an optimal spectrum allocation.

Advantageously, the performance indicators of at least two first links connecting the first access point and at least two first clients of said first access point are estimated at step a) and the determined utility parameter corresponds to the sum of first utility values representing the qualities of the first links, said first utility values being determined on the basis of the performance indicators of the first links.

Preferably, the method comprises a step of:

c) reception of at least one second utility value representing the quality of at least one second link between at least one second access point, connected to said wireless network and operating at a second spectrum configuration, chosen from said finite set of spectrum configurations, and at least one second client of said second access point, wherein the utility parameter further comprises the second utility value.

According to an embodiment, the utility parameter is the sum of the utilities of the links between the first access point and its clients, i.e. the first utility values, and the utilities of the links between the second access point and its clients, i.e. the second utility value(s).

Taking into account the qualities of the links between the second access point and its clients means taking into account the second access point clients satisfactions. This results in a collaboration between access points and improves the overall spectrum allocation efficiency.

Preferably, the second access point is a neighboring access point of the first access point.

By neighboring access point, it is meant that an action of the second access point has an impact on the action of the first access point. For instance, the second access point is within the radio range of the first access point. The second access point may also be at a 2-hops distance from the first access point.

Advantageously, the estimation of the performance indicator takes into account the second spectrum configuration of the second access point.

According to a first embodiment, the estimation of a performance indicator uses a machine learning regression technique.

The use of machine-learning permits to capture the complex interaction between all the parameters, i.e. channel center frequency, channel width and transmit power, and thus enables an accurate prediction of the resulting network performance under a wide variety of operating conditions.

Advantageously, the machine learning regression technique is a supervised learning technique, preferably Support Vector Regression, SVR.

The use of a supervised learning technique permits an efficient and accurate estimation of the performance indicator.

According to a second embodiment, the estimation of a performance indicator uses a Shannon model.

The Shannon model uses the conventional Shannon-Hartley theorem.

Advantageously, the utility parameter is dependent on a type of traffic and/or on a determined fairness level in the wireless network.

This permits to efficiently represent each link's user satisfaction as a function of the actual performance achieved.

According to a first example, the identified new spectrum configuration is the spectrum configuration for which the utility parameter is the highest.

According to a second example, the identified new spectrum configuration is the spectrum configuration for which the probability that the utility parameter is equal to a desired utility value is the highest.

The use of a probability distribution permits an optimal selection of the global spectrum configuration.

Advantageously, the wireless network is a Wireless Local Area Network, for example an IEEE 802.11-based network.

Indeed, the method of the present invention is particularly interesting for this type of wireless networks.

The invention further provides a first access point connected to a wireless network, said first access point being able to operate at a first spectrum configuration, chosen from a finite set of spectrum configurations, each spectrum configuration in the set comprising a channel center frequency, a channel width and a transmit power, wherein said first access point comprises:

a) an estimation module for estimating a performance indicator of at least one first link connecting said first access point and at least one first client of said first access point, for at least one spectrum configuration among said finite set of spectrum configurations; and b) a switch module for switching the operation of the first access point to a new spectrum configuration identified among said finite set of spectrum configurations on the basis of a utility parameter determined at least on the basis of the estimated performance indicator.

Advantageously, the first access point is part of a gateway.

The first access point can be a gateway or a module integrated in a gateway.

The method according to the invention may be implemented in software on a programmable apparatus. It may be implemented solely in hardware or in software, or in a combination thereof.

Since the present invention can be implemented in software, the present invention can be embodied as computer readable code for provision to a programmable apparatus on any suitable carrier medium. A carrier medium may comprise a storage medium such as a floppy disk, a CD-ROM, a hard disk drive, a magnetic tape device or a solid state memory device and the like.

The invention thus provides a computer-readable program comprising computer-executable instructions to enable a computer to perform the method of the invention. The diagram of FIG. 3 illustrates an example of the general algorithm for such computer program.

BRIEF DESCRIPTION OF THE DRAWINGS

The present invention is illustrated by way of examples, and not by way of limitation, in the figures of the accompanying drawings, in which like reference numerals refer to similar elements and in which.

DETAILED DESCRIPTION OF PREFERRED EMBODIMENTS

Figure 1:
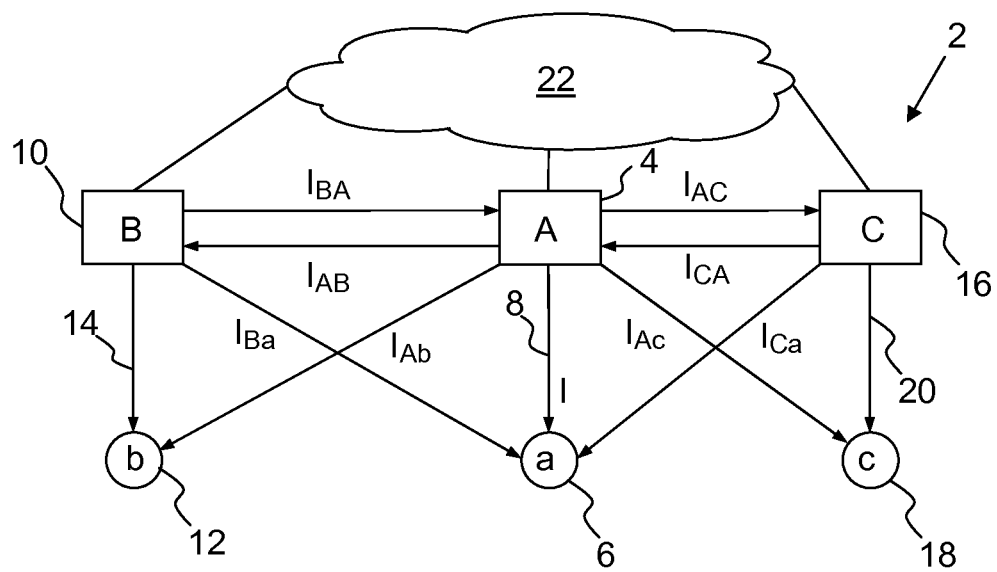
FIG. 1 is a schematic view of a wireless network implementing an embodiment of the present invention.

Referring to FIG. 1, there is shown therein a schematic view of a wireless network 2 implementing the method of the invention.

The wireless network 2 is for instance a Wireless Local Area Network (WLAN), such as an IEEE 802.11 WLAN, more commonly known as a Wi-Fi network.

The wireless network 2 may be also chosen among a Wireless Personal Area Network (WPAN) as defined in IEEE 802.15, Bluetooth, a Wireless Metropolitan Area Network (WMAN) as defined in IEEE 802.16, WiMax, a Wireless Regional Area Network (WRAN) as defined in IEEE 802.22, a High Performance Radio Local Area Network (HiperLAN).

The wireless network 2 comprises a plurality of access points, such as home gateways serving a plurality of clients comprising terminals like personal computers, smart phones, tablets, connected TVs, etc.

According to an embodiment, a plurality of networks defined by different standards may coexist within the wireless network 2. For instance, a home gateway may be provided with an access point enabling a Bluetooth access and an access point providing a WiFi access.

In FIG. 1, three access points and three clients are represented.

A first access point 4, called A, serves a first client 6, called a, through a first wireless link 8, called I.

A second access point 10, called B, serves a second client 12, called b, through a second wireless link 14.

A third access point 16, called C, serves a third client 18, called c, through a third wireless link 20.

The second and third access points 10, 16 are neighboring access points of the first access point 4. More particularly, according to the represented embodiment, the second and third access points 10, 16 are within the radio range of the first access point 4.

Besides, the access points 4, 10, 16 are connected to a backbone network 22 which is typically the Internet network.

Each access point 4, 10, 16 connected to the wireless network 2 is able to operate at any spectrum configuration, comprising a channel center frequency, a channel width and a transmit power, chosen from a finite predefined set of spectrum configurations.

The present invention provides a method of spectrum allocation for the access points 4, 10, 16 wherein each access point 4, 10, 16 is able to switch from a given spectrum configuration to another one in order to improve the quality of the links 8, 14, 20 between each access point 4, 10, 16 and its respective client 6, 12, 18, thus improving the end-users experience.

For simplicity of the description, the links 8, 14, 20 are downlinks from the access points 4, 10, 16 to the clients 6, 12, 18, respectively.

Furthermore, as the second and third access points 10, 16 are neighboring access points of the first access point 4, the following wireless links exist within the wireless network 2:

a link $I_{AB}$ from the first access point 4 to the second access point 10;

a link $I_{BA}$ from the second access point 10 to the first access point 4;

a link $I_{AC}$ from the first access point 4 to the third access point 16;

a link $I_{CA}$ from the third access point 16 to the first access point 4;

a link $I_{Ab}$ from the first access point 4 to the second client 12;

a link $I_{Ac}$ from the first access point 4 to the third client 18;

a link $I_{Ba}$ from the second access point 10 to the first client 6; and a link $I_{ca}$ from the third access point 16 to the first client 6.

In the following description, only the spectrum allocation for the first access point 4 is considered. The same description can be applied to the second and third access points 10, 16.

Figure 2:
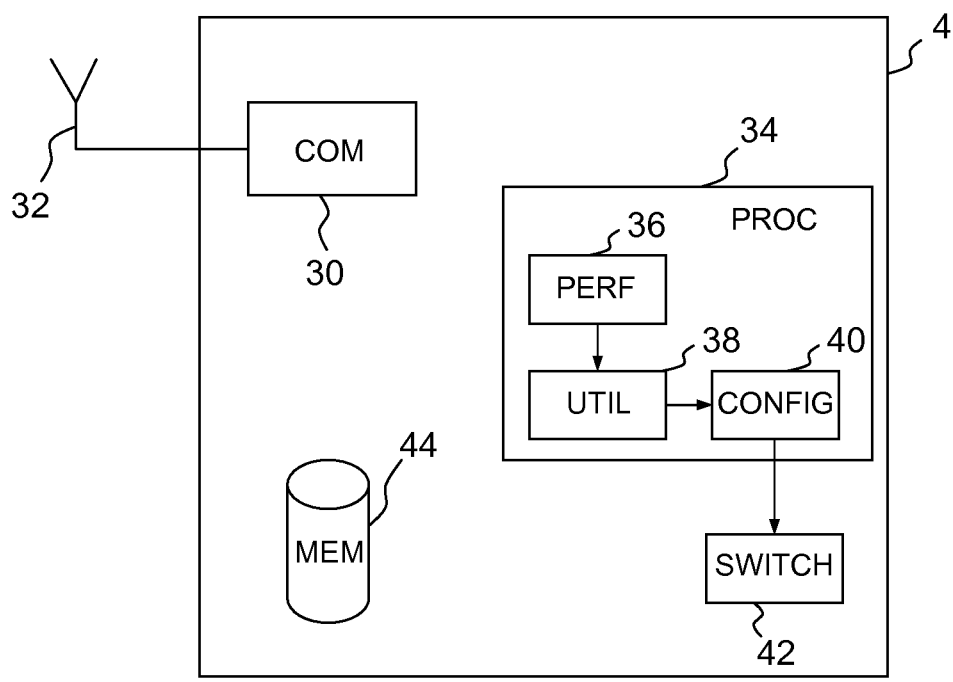
FIG. 2 is a schematic view of a first access point according to an embodiment of the present invention.

FIG. 2 represents the structure of the first access point 4.

The first access point 4 comprises a wireless communication module 30 connected to an antenna 32 and allowing the first access point 4 to send and/or receive information from the neighboring access points 10, 16 and from the clients 6, 12, 18.

The first access point 4 further comprises a processor 34 for processing different information in order to achieve spectrum allocation, according to the method of the present invention.

The processor 34 comprises an estimation module 36 for estimating a performance indicator of the first link 8 connecting said first access point 4 and said first client 6, for each spectrum configuration among said finite set of spectrum configurations.

The performance indicator can be any measurable criterion of the performance of the wireless link between the first access point 4 and the first client 6, such as the throughput and/or the delay and/or the packet loss rate and/or the jitter on said link.

In the following description, the estimated performance indicator is the throughput.

The processor 34 also comprises a determination module 38 for determining a utility parameter comprising a first utility value representing the quality of said first link 8 on the basis of the estimated throughput for each spectrum configuration among said finite set of spectrum configurations and optionally, second and third utility values representing the qualities of the second and third links 14, 20, respectively.

Advantageously, the second and third utility values are received by the communication module 30 from the second and third access points 10, 16 respectively.

Furthermore, the processor 34 comprises an identification module 40 for identifying a spectrum configuration, comprising a channel center frequency and a channel width and a transmit power, among said finite set of spectrum configurations on the basis of the computed utility parameter.

The first access point 4 also comprises a switch module 42 for switching its operation to the identified spectrum configuration.

A storage module 44 is further provided in the first access point 4. The storage module 44 is, for instance, a hard disk drive or a solid state memory device or the like.

Figure 3:
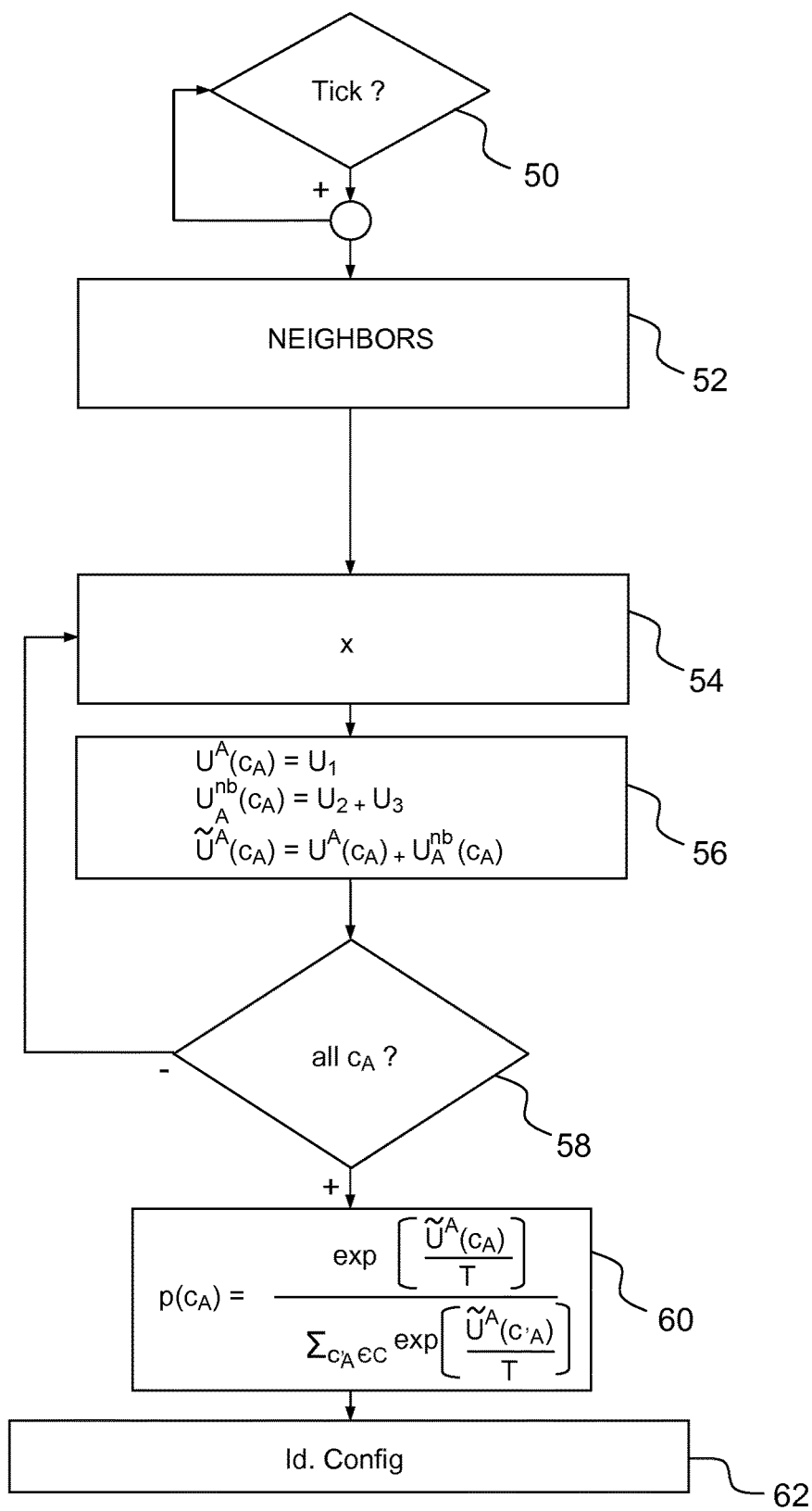
FIG. 3 is a flowchart showing the steps of a spectrum allocation method according to an embodiment of the present invention.

The flowchart of FIG. 3 details the steps of the method of spectrum allocation of the invention, according to a preferred embodiment.

With reference to FIG. 3, at a first step 50, the method is initialized.

This initialization step takes place at random time instants. For instance, it takes place at each tick of a clock. A Poisson clock is advantageously used in order to further improve the efficiency of the spectrum allocation.

Initially, the first access point 4 is operating according to a first spectrum configuration, the second access point 10 is operating according to a second spectrum configuration and the third access point 16 is operating according to a third spectrum configuration.

For instance:
in the first spectrum configuration, the channel center frequency is equal to 5.180 GHz, the channel width is equal to 40 MHz and the transmit power is equal to 20 dBm;
in the second spectrum configuration, the channel center frequency is equal to 5.200 GHz, the channel width is equal to 20 MHz and the transmit power is equal to 10 dBm; and
in the third spectrum configuration, the channel center frequency is equal to 5.200 GHz, the channel width is equal to 40 MHz and the transmit power is equal to 14 dBm.

At step 52, the first access point 4 discovers its neighboring access points 10, 16.

According to an embodiment, the access points 4, 6, 10 send wireless frames that contain their public IP addresses on the backbone network 22. These frames are sent using the largest possible transmit power, in order to benefit from the largest possible range. Thus, each access point learns about the public IP addresses of the neighboring access points.

Besides, at step 52, the first access point 4 queries its neighboring access points 10, 16 for some information about their spectrum configurations, such as:
the physical rates, or modulations, that they are using for transmission;
the transmit powers that they are using for transmission;
their airtime ratios, i.e. the proportion of time during which they are active; and
the channel gains measured by these neighboring access points.

This query is preferably done using the backbone network 22.

Furthermore, At step 52, the first access point 4 sends, using its communication module 30, a query message to each neighboring access point 10, 16 requesting the second and third utility values $U_2$, $U_3$ of the second and third links 14, 20, respectively, when the first access point's spectrum configuration is the first spectrum configuration. Then, at step 54, the first access point 4 estimates the throughput achievable on the first link 8.

According to an embodiment, this throughput estimation is simply based on measures of the RSSI (Received Signal Strength Indication) and rate received by the client 6 on the first link 8, and then transmitted to the first access point 4.

Alternatively, information on the neighboring environment of the first access point 4 are advantageously used to improve the estimation. More particularly, these information comprise the information queried at step 52 from the second and third access points 6, 10.

A machine learning approach is advantageously used to estimate the most likely throughput given this information on the neighboring environment. Preferably, a Support Vector Regression (SVR) technique is used.

For this, at a preliminary not represented step, the access point 4 defines a function f providing a throughput estimation for all the possible spectrum configurations of the access points 4, 10, 16.

The SVR technique is implemented by the estimation module 36.

According to the SVR technique, the estimation of the throughput uses several factors, called features:
The powers $P_1$, $P_2$, $P_2$, $P_3$, $P_4$, $P_5$, $P_6$, $P_7$, $P_8$, $P_9$, $P_{10}$, $P_{11}$ received, respectively, on the links 8, 14, 20, $I_{AB}$, $I_{BA}$, $I_{AC}$, $I_{CA}$, $I_{Ab}$, $I_{Ac}$, $I_{Ba}$, $I_{Ca}$. These powers depend on the transmit powers of the access points 4, 10, 16 and on the various channel gains. This information is readily available from step 52. There are 1+5K such power quantities in general, where K is the number of neighboring access points. Here, there are eleven power quantities as there are two neighboring access points 10, 16.
The channel widths used on the links 8, 14, 20. There are 1+K such values in the case of K neighboring access points.
The spectral separations between the center frequency used by the first access point 4, and the center frequencies used by the neighboring access points 10, 16. There are K such values in the case of K neighboring access points.
The traffic loads of the links 14, 20. There are K such values in the case of K neighboring access points.
The physical rates used on the links 14, 20. There are K such values in the case of K neighboring access points.

Therefore, d=2+9K features are used by the first access point 4 to estimate the throughput on the first link 8 in the presence of K interferers, i.e. the neighboring access points, using arbitrary spectrum settings.

In the represented example, there are twenty features. Advantageously, all of these features are either known or measured by the access points 4, 10, 16.

The estimation of the throughput using the SVR technique comprises:
1—a learning step
During this step, the first access point 4 sends a saturated traffic, i.e. a traffic sent at the highest rate possible, without rate control on the first link 8. The first access point 4 then measures the achieved throughput and stores it as y in the storage module 44. This process is repeated at least for two spectrum configurations z from the set of spectrum configurations.

The following is an example of algorithm implemented by the estimation module 36 for this learning step:

Set n the number of iterations, for example 500. This number of iterations preferably corresponds to a number of tested spectrum configurations of the access points.

For each iteration i=1 to n,
obtain a corresponding vector $z_i \in \mathbb{R}^d$ of features. For instance, $z_i[1]$ corresponds to the power received on the first link 8, i.e. $P_1$;
send saturated traffic on the first link 8; and
measure the achieved throughput $y_i$.

2—a data fitting step

This step consists in defining the function $f: \mathbb{R}^d \to \mathbb{R}$ that maps each spectrum configuration to the corresponding estimated throughput y on the first link 8. This function is as follows:

$$f(z) = \sum_{i=1}^{n} \alpha_i k(z_i, z) + b,$$

where n is the number of iterations in the learning step, $\alpha_i, b$ are coefficients found from the SVR method through an optimization procedure, as for example the procedure described for example in Smola et al. "A tutorial on support vector regression", Statistics and Computing 14: 199-222, 2004 and in Drucker et al. "Support vector regression machines", Advances in neural information processing systems (1997): 155-161, and $k(z_i, z) = \exp(-\gamma \|z - z_i\|^2)$, where $\gamma$ is a coefficient defined during the optimization procedure.

Thus, the function f set at the preliminary step permits an estimation of the throughput on the first link 8 for each possible spectrum configuration of the first access point 4, taking into account the spectrum configurations of its neighboring access points 10, 16.

At step 54, the first access point 4 estimates the throughput x on the first link 8 using the set function f.

At step 56, the first access point 4 determines a first utility value $U_1$ representing the quality of the first link 8 on the basis of the estimated throughput.

Advantageously, the first utility value $U_1$ is a function of the estimated throughput x and it depends on the type of traffic and on a determined fairness level in the wireless network 2 which is set by an operator of said network.

Table 1 provides examples of utility functions according to the type of traffic and the fairness level:

TABLE 1

| Type of traffic | Fairness level | Utility function |
|---|---|---|
| data | TCP fairness | $U_l(x) = \dfrac{x^{1-\alpha}}{1-\alpha}, \alpha = 2$ |
| data | Max-min fairness | $U_l(x) = \dfrac{x^{1-\alpha}}{1-\alpha}, \alpha \to \infty$ |
| data | Maximum throughput | $U_l(x) = x$ |
| data | Proportional fair | $U_l(x) = \log(x)$ |
| Any | Guaranteed throughput of X | $U_l(x) = 1$ if $x \geq X$, and 0 otherwise |

The first access point 4 then determines a neighboring utility value as the sum of the second and third utility values received from the neighboring access points at step 52.

The first access point then determines a utility parameter $\tilde{U}^A(c_A)$ equal to the sum of the first value and the neighboring utility values.

At step 58, the first access point 4 checks if utility parameters have been determined for all the spectrum configurations within the finite set. If not, the process returns to step 54.

When all the utility parameters for all the spectrum configurations have been determined, the process continues with step 60.

At step 60, the first access point 4 computes the probability that the utility parameter is equal to a desired utility value.

According to an embodiment, the first access point 4 uses the Gibbs sampling method, according to which the desired utility value is the optimal utility value.

According to the Gibbs sampling method, the first access point 4 computes for each spectrum configuration the following probability:

$$p(c_A) = \frac{\exp\left(\dfrac{\tilde{U}^A(c_A)}{T}\right)}{\sum_{c'_A \in \mathcal{C}} \exp\left(\dfrac{\tilde{U}^A(c'_A)}{T}\right)},$$

where $\mathcal{C}$ is the finite set of spectrum configurations and T is a parameter, called temperature, which is a small real number comprised, for example, between 0.1 and 1.

At step 62, the first access point 4 identifies the spectrum configuration providing the highest probability and switches to operate according to this spectrum configuration.

While there has been illustrated and described what are presently considered to be the preferred embodiments of the present invention, it will be understood by those skilled in the art that various other modifications may be made, and equivalents may be substituted, without departing from the true scope of the present invention. Additionally, many modifications may be made to adapt a particular situation to the teachings of the present invention without departing from the central inventive concept described herein. Furthermore, an embodiment of the present invention may not include all of the features described above. Therefore, it is intended that the present invention is not limited to the particular embodiments disclosed, but that the invention includes all embodiments falling within the scope of the appended claims.

Expressions such as "comprise", "include", "incorporate", "contain", "is" and "have" are to be construed in a non-exclusive manner when interpreting the description and its associated claims, namely construed to allow for other items or components which are not explicitly defined also to be present. Reference to the singular is also to be construed to be a reference to the plural and vice versa.

A person skilled in the art will readily appreciate that various parameters disclosed in the description may be modified and that various embodiments disclosed and/or claimed may be combined without departing from the scope of the invention.

For instance, in the above description, each access point has one client. The invention is applicable when there is a plurality of clients for each access point. In this case, the utilities of all the links are considered for the determination of the utility parameter.

Besides, it is possible to select the new spectrum configuration as the spectrum configuration providing the highest utility parameter instead of the highest probability of obtaining a desired utility.

Furthermore, instead of using a machine learning technique, the Shannon model can be used in order to estimate the throughput while taking into account the neighboring access points configurations.

The invention claimed is:

1. A method of spectrum allocation in a wireless network performed by a first access point connected to said wireless network, the method comprising:
operating by the first access point at a first spectrum configuration, chosen from a pre-determined finite set of spectrum configurations,
each spectrum configuration in the set comprising
a channel center frequency,
a channel width and
a transmit power
determining by the first access point a first utility value representing a quality of a first link connecting the first access point and a first client of said first access point,
wherein the first utility value is based on each of the spectrum configurations in the said pre-determined finite set of spectrum configurations,
wherein at least one spectrum configuration in the said pre-determined finite set of spectrum configurations is different from the first spectrum configuration;
receiving by the first access point from a second access point a second utility value representing a quality of a second link connecting the second access point at least one second client of said second access point, operating at a second spectrum configuration, chosen from said pre-determined finite set of spectrum configurations;
determining by the first access point a new spectrum configuration among said pre-determined finite set of spectrum configurations based at least on the first and the second utility values, and
in response to determining the new spectrum configuration is different from the first spectrum configuration, using by the first access point the channel center frequency, the channel width and the transmit power of the new spectrum configuration for operating the access point.

2. The method of claim 1
wherein the at least one second access point is a neighboring access point of the first access point.

3. The method of claim 1,
wherein said determining the new spectrum configuration comprises determining a utility parameter based on the first and the second utility values,
the utility parameter being dependent on a type of traffic and/or on a determined fairness level in the wireless network.

4. The method of claim 3, the method further comprising estimating a further performance indicator of a further first link connecting the first access point and a further first client of said first access point for the at least one spectrum configuration among said finite set of spectrum configurations,
the utility parameter comprising a sum of first utility values representing the quality of the first link and the further first link, said first utility values being based on the performance indicators of the first link and the further first link.

5. The method of claim 3,
wherein the utility parameter comprises a highest utility parameter among other utility parameters related to other spectrum configurations.

6. The method of claim 3,
wherein the utility parameter comprises a highest probability of being equal to a desired utility value.

7. The method of claim 1,
wherein the wireless network is an IEEE 802.11-based network.

8. The method of claim 1, the method further comprising estimating by the first access point a performance indicator of the first link connecting the first access point and the first client of said first access point, for the at least one spectrum configuration among said pre-determined finite set of spectrum configurations, the first utility value being based on the estimated performance indicator.

9. The method of claim 8,
wherein the estimating of the performance indicator takes into account the second spectrum configuration of the at least one second access point.

10. The method of claim 8,
wherein the estimating of the performance indicator further comprises using a machine learning regression technique.

11. The method of claim 10,
wherein the machine learning regression technique is a Support Vector Regression (SVR) supervised learning technique.

12. The method of claim 8,
wherein the estimating of the performance indicator further comprises using a Shannon model.

13. A first access point connected to a wireless network, said first access point being able to operate at a first spectrum configuration, chosen from a pre-determined finite set of different spectrum configurations, each spectrum configuration in the set comprising a channel center frequency, a channel width and a transmit power,
wherein said first access point comprises:
memory storing instructions; and
a processor, wherein the processor, when executing said instructions, is configured to:
determine a first utility value representing a quality of a first link connecting said first access point and a first client of said first access point,
wherein the first utility value is based on each of the spectrum configurations in the said pre-determined finite set of spectrum configurations,
wherein at least one spectrum configuration in the said pre-determined finite set of spectrum configurations is different from the first spectrum configuration;
receive from a second access point a second utility value representing a quality of a second link connecting the second access point and at least one second client of said second access point, operating at a second spectrum configuration, chosen from said pre-determined finite set of spectrum configurations and
wherein the determining further comprises determining a new spectrum configuration among said pre-determined finite set of spectrum configurations based at least on the first and the second utility values;
switch the operation of the first access point from the first spectrum configuration to a new spectrum configuration in response to determining the new spectrum configuration is different from the first spectrum configuration, said switching comprising using the channel center frequency, the channel width and the transmit power of the new spectrum configuration.

14. The first access point of claim 13,
wherein said first access point is a part of a gateway.

15. A non-transitory computer-readable storage medium comprising computer-executable instructions stored therein which upon execution cause at least one processor in a first access point to:
- operate, with processing circuitry, the first access point at a first spectrum configuration, chosen from a pre-determined finite set of different spectrum configurations, each spectrum configuration in the set comprising
  - a channel center frequency,
  - a channel width and
  - a transmit power;
- determine a first utility value representing a quality of a first link connecting said first access point and a first client of said first access point,
- wherein the first utility value is based on each of the spectrum configurations in the said pre-determined finite set of spectrum configurations,
- wherein at least one spectrum configuration in the said pre-determined finite set of spectrum configurations is different from the first spectrum configuration;
- receive from a second access point a second utility value representing a quality of a second link connecting the second access point and at least one second client of said second access point, operating at a second spectrum configuration, chosen from said pre-determined finite set of spectrum configurations;
- determine a new spectrum configuration among said pre-determined finite set of spectrum configurations based at least on the first and the second utility values; and
- in response to determining the new spectrum configuration is different from the spectrum configuration, use the channel center frequency, the channel width and the transmit power of the new spectrum configuration.

16. A first access point connected to a wireless network, said first access point comprising
- a receiver;
- a processor coupled to said receiver, the processing configured to:
- operate the first access point at a first spectrum configuration, chosen from a pre-determined finite set of different spectrum configurations, each spectrum configuration in the set comprising
  - a channel center frequency,
  - a channel width and
  - a transmit power,
- determine a first utility value representing a quality of a first link connecting said first access point and a first client of said first access point,
- wherein the first utility value is based on each of the spectrum configurations in the said pre-determined finite set of spectrum configurations,
- wherein at least one spectrum configuration in the said pre-determined finite set of spectrum configurations is different from the first spectrum configuration;
- receive from a second access point a second utility value representing a quality of a second link connecting the second access point and at least one second client of said second access point, operating at a second spectrum configuration, chosen from said pre-determined finite set of spectrum configurations;
- determine a new spectrum configuration among said pre-determined finite set of spectrum configurations based at least on the first and the second utility values; and
- in response to determining the new spectrum configuration is different from the first spectrum configuration, use the channel center frequency, the channel width and the transmit power of the new spectrum configuration for operating the first access point.

17. The first access point of claim 16,
wherein said first access point is a part of a gateway.

* * * * *